United States Patent
Bouillet et al.

(10) Patent No.: US 10,769,193 B2
(45) Date of Patent: Sep. 8, 2020

(54) PREDICTIVE MODEL CLUSTERING

(71) Applicant: International Business Machines Corporation, Armonk, NY (US)

(72) Inventors: Eric Bouillet, Englewood, NJ (US); Bei Chen, Dublin (IE); Randall L. Cogill, Dublin (IE); Thanh L. Hoang, Kildare (IE); Marco Laumanns, Zurich (DE); Karol W. Lynch, Dublin (IE); Rahul Nair, Dublin (IE); Pascal Pompey, Nanterre (FR); John Sheehan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 15/628,160

(22) Filed: Jun. 20, 2017

(65) Prior Publication Data
US 2018/0365249 A1    Dec. 20, 2018

(51) Int. Cl.
| | | |
|---|---|---|
| *G06F 16/00* | (2019.01) | |
| *G06F 16/35* | (2019.01) | |
| *G06K 9/62* | (2006.01) | |
| *G06F 16/28* | (2019.01) | |

(52) U.S. Cl.
CPC .......... *G06F 16/355* (2019.01); *G06F 16/285* (2019.01); *G06K 9/6218* (2013.01); *G06F 16/35* (2019.01)

(58) Field of Classification Search
CPC ...................................................... G06F 16/00
See application file for complete search history.

(56) References Cited

U.S. PATENT DOCUMENTS

| | | | |
|---|---|---|---|
| 6,430,539 B1 * | 8/2002 | Lazarus | G06Q 30/02 |
| | | | 705/14.1 |
| 6,584,456 B1 | 6/2003 | Dom et al. | |
| 8,180,627 B2 | 5/2012 | Bogl et al. | |
| 8,374,974 B2 | 2/2013 | Chen et al. | |
| 8,495,680 B2 | 7/2013 | Bentolila et al. | |
| 2003/0176931 A1 * | 9/2003 | Pednault | G06K 9/6219 |
| | | | 700/31 |
| 2009/0112533 A1 | 4/2009 | Grichnik et al. | |

(Continued)

OTHER PUBLICATIONS

Kyriakopoulos, A. et al., "Combining Clustering with Classification for Spam Detection in Social Bookmarking Systems", Sep. 15, 2008, pp. 47-54.

(Continued)

*Primary Examiner* — Khanh B Pham
(74) *Attorney, Agent, or Firm* — Scully, Scott, Murphy & Presser, P.C.; Kurt Goudy, Esq.

(57) ABSTRACT

Performing data clustering in a model property vector space. Input data is received comprising a plurality of data instances in a data vector space. A model property vector specification is defined for a model vector. Information is identified from the input data, and a model property vector is created in the model property vector space for each of the plurality of data instances. A target number of clusters is identified and used to perform a data clustering procedure. An output is generated comprising a plurality of data segments and one or more clustering rules. For each data cluster, a predictive model is constructed for each data segment of the plurality of data segments.

17 Claims, 6 Drawing Sheets

(56) References Cited

U.S. PATENT DOCUMENTS

| | | |
|---|---|---|
| 2013/0346351 A1 | 12/2013 | Lin et al. |
| 2015/0186792 A1* | 7/2015 | Chidlovskii ........... G06Q 50/26 706/12 |
| 2015/0339572 A1 | 11/2015 | Achin et al. |
| 2018/0075357 A1* | 3/2018 | Subramanian ......... G06N 20/00 |
| 2018/0101765 A1* | 4/2018 | Chiang ................ G06N 3/0454 |

OTHER PUBLICATIONS

Bouwmeester, W. et al., "Prediction models for clustered data: comparison of a random intercept and standard regression model", 2013, pp. 1-10.

Trivedi, S. et al., "The Utility of Clustering in Prediction Tasks", Sep. 2011, pp. 1-11.

Dinuzzo, F., "Learning Output Kernels for Multi-Task Problems", Jan. 16, 2013, pp. 1-22.

Gawrysiak, P. et al., "Regression-yet another clustering method", 2001, pp. 1-10.

Soni, R. et al., Improved Twitter Sentiment Prediction through 'Cluster-then-Predict Model', IJCSN, vol. 4, Aug. 2015, pp. 559-563.

Kyriakopoulos, A. et al., "Combining Clustering with Classification for Spam Detection in Social Bookmarking Systems", 2008, pp. 1-8.

Steinbach, M, et al., "The Challenge of Clustering High Dimensional Data", 2004, pp. 1-33.

* cited by examiner

PREDICTIVE MODEL CLUSTERING

FIELD

The present application relates generally to data analytics and, more particularly, to methods, apparatuses, and systems for performing predictive model clustering.

BACKGROUND

Big data analytics systems utilize a multiplicity of models, resulting in substantial computational and maintenance costs. Few users are able to afford the cost of deploying and maintaining a complete set of targeted models using existing approaches. Some illustrative approaches include model clustering on a model parameter space, data clustering, and prediction by clustering. Model clustering trains a plurality of models to estimate one or more parameters for the models, and then performs clustering. However, a large number of models must be trained, and the training process is computationally expensive.

Conventional data clustering methods are geared to performing data clustering on a data vector space, and are not configured for solving forecasting problems. Another conventional approach, prediction by clustering, performs clustering of data on a data vector space, and then builds a predictive model for each cluster. In some cases, prediction by clustering provides improved accuracy relative to other approaches. However, a high-dimensional data vector space is required. Data in this vector space is sparse, including many irrelevant and noisy features. Moreover, high dimensionality may result in a clustering that makes no sense. Thus, there exists a need to overcome at least one of the preceding deficiencies and limitations of the related art.

SUMMARY

The following summary is merely intended to be exemplary. The summary is not intended to limit the scope of the claims.

A method for performing data clustering in a model property vector space, in one aspect, may comprise receiving input data from a database, the input data comprising a plurality of data instances in a data vector space; defining a model property vector specification for a model vector; using the input data and the model property vector specification to identify information from the input data; creating a model property vector in the model property vector space from the identified information for each of the plurality of data instances; identifying a target number of clusters comprising a plurality of data clusters; using the target number of clusters and the plurality of data instances in the model property vector space to perform a data clustering procedure; generating an output from the data clustering procedure comprising a plurality of data segments and one or more clustering rules for the plurality of data clusters; and for each data cluster of the plurality of data clusters, constructing a predictive model for each data segment of the plurality of data segments.

A computer program product for performing data clustering in a model property vector space, in another aspect, may comprise a computer-readable storage medium having a computer-readable program stored therein, wherein the computer-readable program, when executed on a processor, causes the processor to receive input data from a database, the input data comprising a plurality of data instances in a data vector space; define a model property vector specification for a model vector; use the input data and the model property vector specification to identify information from the input data; create a model property vector in the model property vector space from the identified information for each of the plurality of data instances; identify a target number of clusters comprising a plurality of data clusters; use the target number of clusters and the plurality of data instances in the model property vector space to perform a data clustering procedure; generate an output from the data clustering procedure comprising a plurality of data segments and one or more clustering rules for the plurality of data clusters; and, for each data cluster of the plurality of data clusters, construct a predictive model for each data segment of the plurality of data segments.

An apparatus for performing data clustering in a model property vector space, in another aspect, may comprise a processor and a memory coupled to the processor, wherein the memory comprises instructions which, when executed by the processor, provide a model property vector creation module, a data clustering module operatively coupled to the model property vector creation module, and a predictive models training module operatively coupled to the data clustering module. The model property vector creation module is configured to receive input data from a database, the input data comprising a plurality of data instances in a data vector space; define a model property vector specification for a model vector; use the input data and the model property vector specification to identify information from the input data; create a model property vector in the model property vector space from the identified information for each of the plurality of data instances; and identify a target number of clusters comprising a plurality of data clusters. The data clustering module is configured to use the target number of clusters and the plurality of data instances in the model property vector space to perform a data clustering procedure; and to generate an output from the data clustering procedure comprising a plurality of data segments and one or more clustering rules for the plurality of data clusters. The predictive models training module is configured, for each data cluster of the plurality of data clusters, to construct a predictive model for each data segment of the plurality of data segments.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
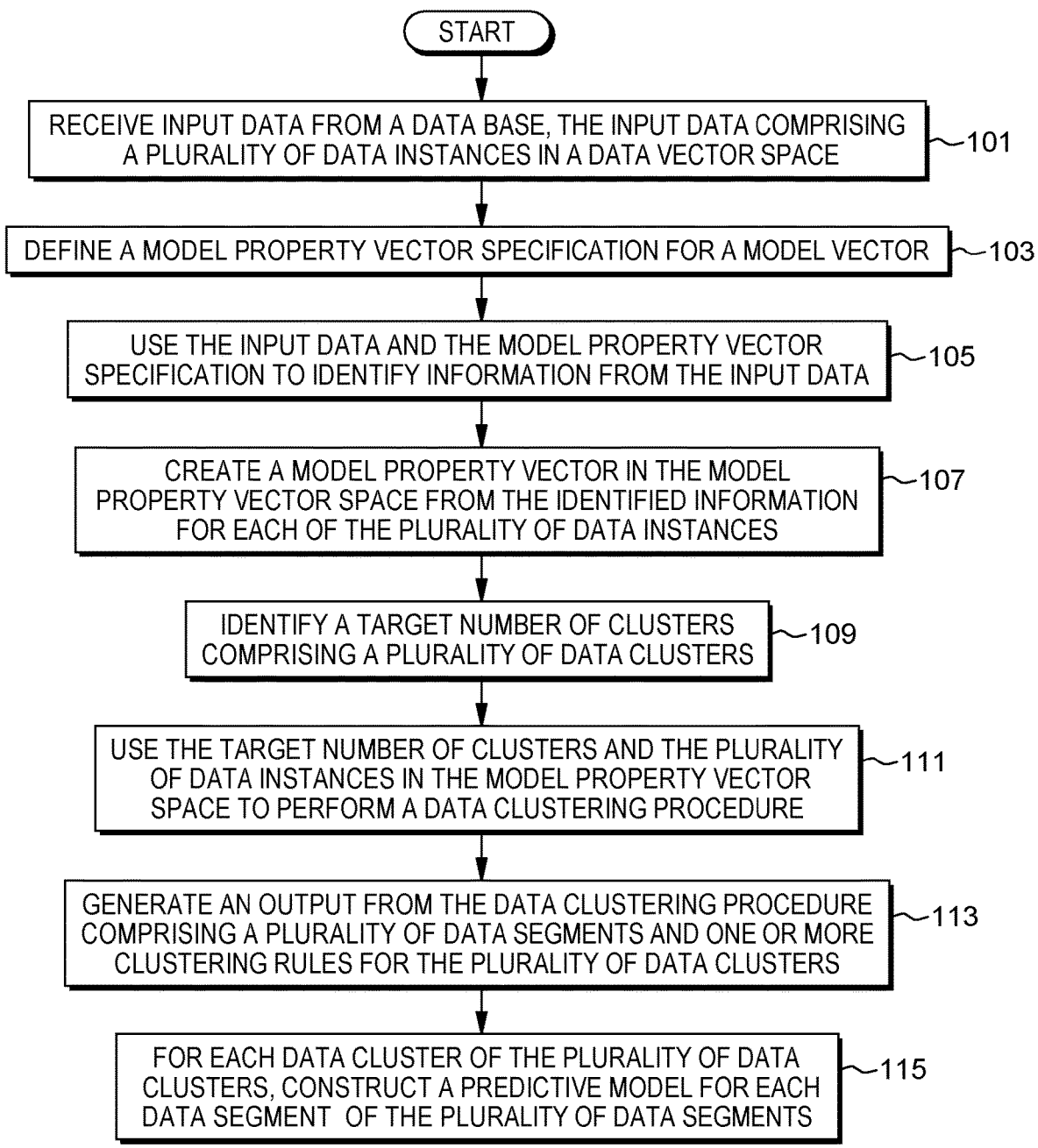
FIG. 1 is a flowchart illustrating a first exemplary method for performing data clustering in a model property vector space in accordance with one or more embodiments of the present invention.

FIG. 1 is a flowchart illustrating a first exemplary method 100 for performing data clustering in a model property vector space in accordance with one or more embodiments of the present invention. For purposes of illustration, blocks 101-107 may be conceptualized as implementing a module for creating model property vectors. Likewise, blocks 111-113 may be conceptualized as implementing a module for clustering data in a model property vector space. Similarly, block 115 may be conceptualized as implementing a module for performing predictive models training on each data cluster outputted by the module for clustering data.

The procedure of FIG. 1 commences at block 101 where input data is received from a database. The input data comprises a plurality of data instances in a data vector space. For purposes of illustration, the database may include temporal features and geographical features. Next, at block 103, a model property vector specification is defined for a model vector. The vector specification is indicative of one or more types or categories of information that are to be included in the vector, and how this information is organized within the vector. Then, at block 105, the input data and the model property vector specification are used to identify information from the input data. For example, this information may include temporal information, geographic information, other types of information, or any of various combinations thereof.

The operational sequence of FIG. 1 advances to block 107 where a model property vector is created in the model property vector space from the identified information for each of the plurality of data instances. The model property vector includes one or more attributes for characterizing a predictive model. For instance, the attributes may include one or more attributes related to temporal information, one or more attributes related to geographic information, or one or more attributes related to a category for which a prediction is to be made, or any of various combinations thereof. Temporal information is any information that can be used to predict a time horizon, a schedule, an arrival time a departure time, a delay, a calendar, a time at which an event occurs, or a time at which an event is predicted to occur. Geographic information is any information that can be used to predict a geographic location, a set of geographic or Global Positioning System (GPS) coordinates that specify a latitude and a longitude, or a name of a location. A model category may be used to specify a category for an item that is to be predicted, such as an arrival time, a departure time, or a length of a delay.

A target number of clusters comprising a plurality of data clusters is identified at block 109. Then, at block 111, the target number of clusters and the plurality of data instances in the model property vector space are used to perform a data clustering procedure. Once we have a model property vector for each data instance, clustering can be performed using a data algorithm known to those skilled in the art as a k-mean algorithm, or as a hierarchical clustering algorithm. However, in contrast to conventional approaches, the procedure of FIG. 1 performs clustering on a vector space that is less noisy and has much lower dimensionality than the original data vector space.

At block 113, an output is generated from the data clustering procedure. This output comprises a plurality of data segments and one or more clustering rules for the plurality of data clusters. Next, at block 115, for each data cluster of the plurality of data clusters, a predictive model is constructed for each data segment of the plurality of data segments.

The procedure of FIG. 1 clusters data in the model property vector space. The model property vector includes attributes characterizing a predictive model, such as temporal information, geographical information, and one or more prediction categories. The temporal information comprises the prediction horizon or the prediction time, or both. The geographical information is associated with one or more target variables. Some illustrative examples of geographic information includes the geographic location, a name of a transportation station, a transportation line identifier, or a journey pattern. The one or more prediction categories include one or more categorical attributes that differentiate among various types of predictions, such as the arrival or departure time, or a prediction of peak travel times.

In contrast to the method of FIG. 1, conventional approaches cluster the data on a data feature space rather than on the model property vector space. This model property vector space is defined in terms of a model property, rather than a data property. Thus, when the model property vector space is properly defined, clustering of models in that vector space generates a group of models that have very similar characteristics. A proper model property space may be defined, for example, with reference to a prediction horizon and geographical information. Models with similar prediction horizons will behave very similarly. Likewise, models concerning prediction of targets that are generated from locations that are in close proximity to one another would behave very similarly. Suitable model property spaces may be defined using one or more parameters in addition to, in lieu of, using geography and temporal horizons. For example, an exemplary model property space may be defined by a user specifying or selecting one or more attributes for the model. Thus, for purposes of illustration, if it is desired to predict a train delay, users can specify train class (high-speed, regional or subways) as a property or attribute for the model because a respective delay distribution will be very different for each of the different corresponding train classes.

In contrast to conventional data clustering, which is the outcome of measuring data homogeneity, the procedure of FIG. 1 segments data using model properties. Consequently, data within the same or identical segment are not necessarily similar in the data vector space, but are similar in the model property space. This concept is illustrated in greater detail with reference to FIG. 4, to be described hereinafter.

The procedure of FIG. 1 reduces a number or quantity of models that are required to perform a given data analytics task using conventional data clustering approaches. The number or quantity of models is reduced based upon one or more common predictive functions of the models. For example, one or more models may be used in conjunction with temporal information to forecast a time horizon or to predict time. Likewise, one or more models may be used in conjunction with geographic location or location names to predict a current or intended geographic location. The number of required models is reduced by clustering the models in the model property vector space, to achieve a conservation of time and resources while maintaining predictive accuracy.

Figure 2:
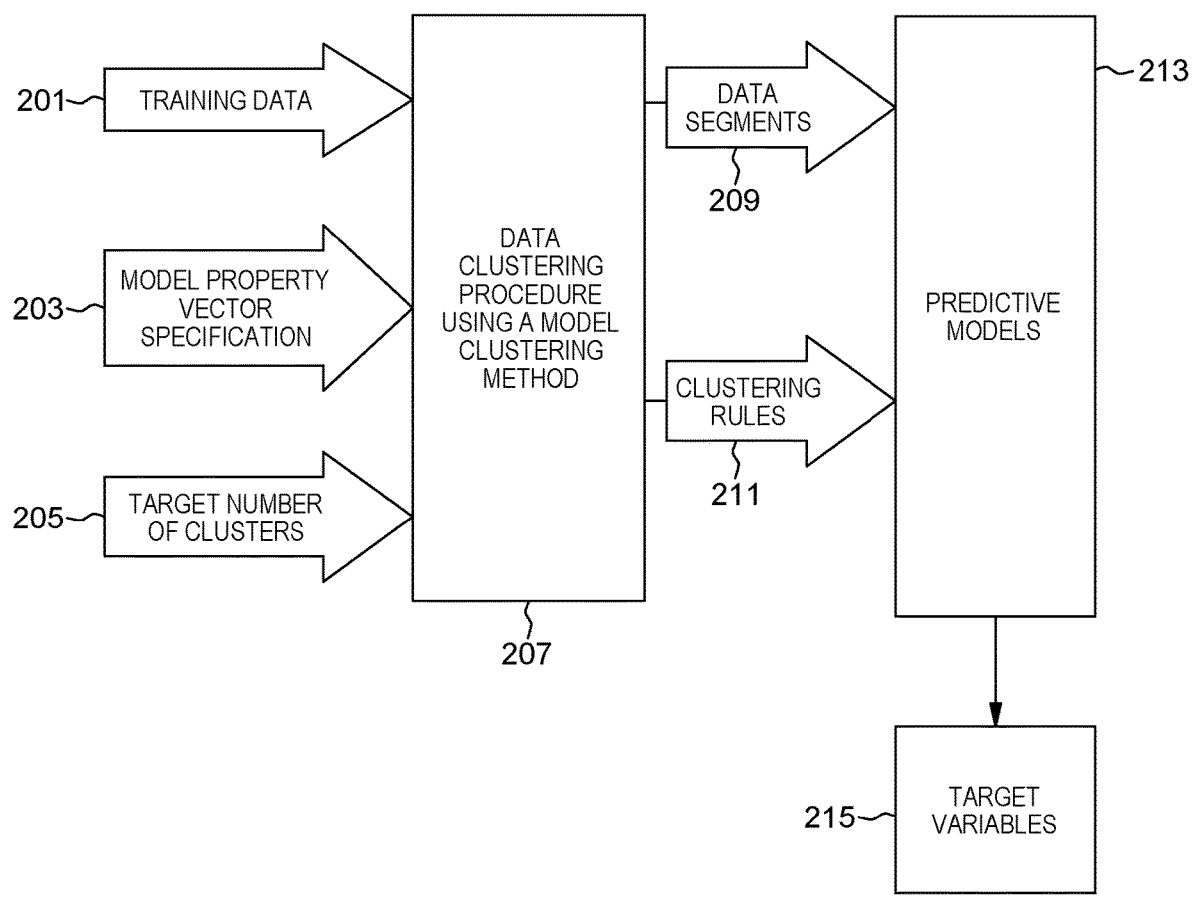
FIG. 2 is an exemplary data flow diagram for the method of FIG. 1 in accordance with one or more embodiments of the present invention.

FIG. 2 is an exemplary data flow diagram for the method of FIG. 1 in accordance with one or more embodiments of the present invention. A set of training data 201, a model property vector specification 203, and a target number of clusters 205 are inputted to a data clustering procedure using a model clustering method 207. The training data 201 corresponds to the input data comprising a plurality of data instances of block 101 (FIG. 1). The model property vector specification 203 (FIG. 2) corresponds to the model property vector specification that was defined at block 103 (FIG. 1). The target number of clusters 205 (FIG. 2) corresponds to the target number of clusters that was identified at block 109 (FIG. 1).

The data clustering procedure using a model clustering method 207 (FIG. 2) corresponds to the operations of blocks 105, 111, and 113 of FIG. 1. The data clustering procedure using a model clustering method 207 (FIG. 2) generates outputs comprising one or more data segments 209 and a set of clustering rules 211. The one or more data segments 209 may be regarded as data partitions, and the set of clustering rules 211 may be regarded as a clustering specification. The one or more data segments 209 and the clustering rules 211 are inputted to a set of predictive models 213. The set of predictive models 213 are used to generate a set of target variables 215.

The techniques discussed in conjunction with FIGS. 1 and 2 are different from conventional approaches such as model clustering on the model parameter space, generic data clustering, and prediction by clustering. Model clustering on the model parameter space trains models to estimate one or more parameters for the models and then performs clustering. However, the number of models that must be trained is large and, thus, computationally expensive. Generic data clustering performs clustering of data on a data vector space, but is not related to solving any forecasting problems. Prediction by clustering clusters data within the data vector space, and then builds a predictive model per cluster. In some cases, prediction by clustering improves accuracy. Unfortunately, the required dimensionality of the vector space is quite high, the vector space is very sparsely populated, and the vector space includes many irrelevant and noisy features. In some cases, the dimensionality issue yields results in the vector space that do not make sense from a practical standpoint.

models before clustering. Model clustering on the model parameter space provides a separate model property space, and does not perform clustering on data feature space.

Conventional data clustering does not cluster on model property space, nor is a separate model property space provided. Clustering is performed within data feature space. Prediction by clustering does not train a model before clustering, does not perform clustering on model property space, and does not provide a separate model property space. Clustering is performed on data feature space.

The procedures of FIGS. 1 and 2 provide several advantages. Computational cost is significantly reduced, and model management is significantly simplified. Moreover, these procedures are widely applicable to any of a variety of applications. Some illustrative examples of applications include tracking shared communal bicycle inventories in urban areas, predicting train arrival times, modeling airline delays, and forecasting energy demands. In the case of shared communal bicycles, an illustrative model property is geolocation. Likewise, in the case of predicting train arrival times, an illustrative model property is a prediction horizon. For airline delay modeling, an exemplary model property is rush hour. For energy demand forecasting, multiple model properties may be employed, such as geolocation and substation features. Substation features may specify whether a given substation is at a ski resort, in contrast to an industrial park or a residential area.

Figure 3:
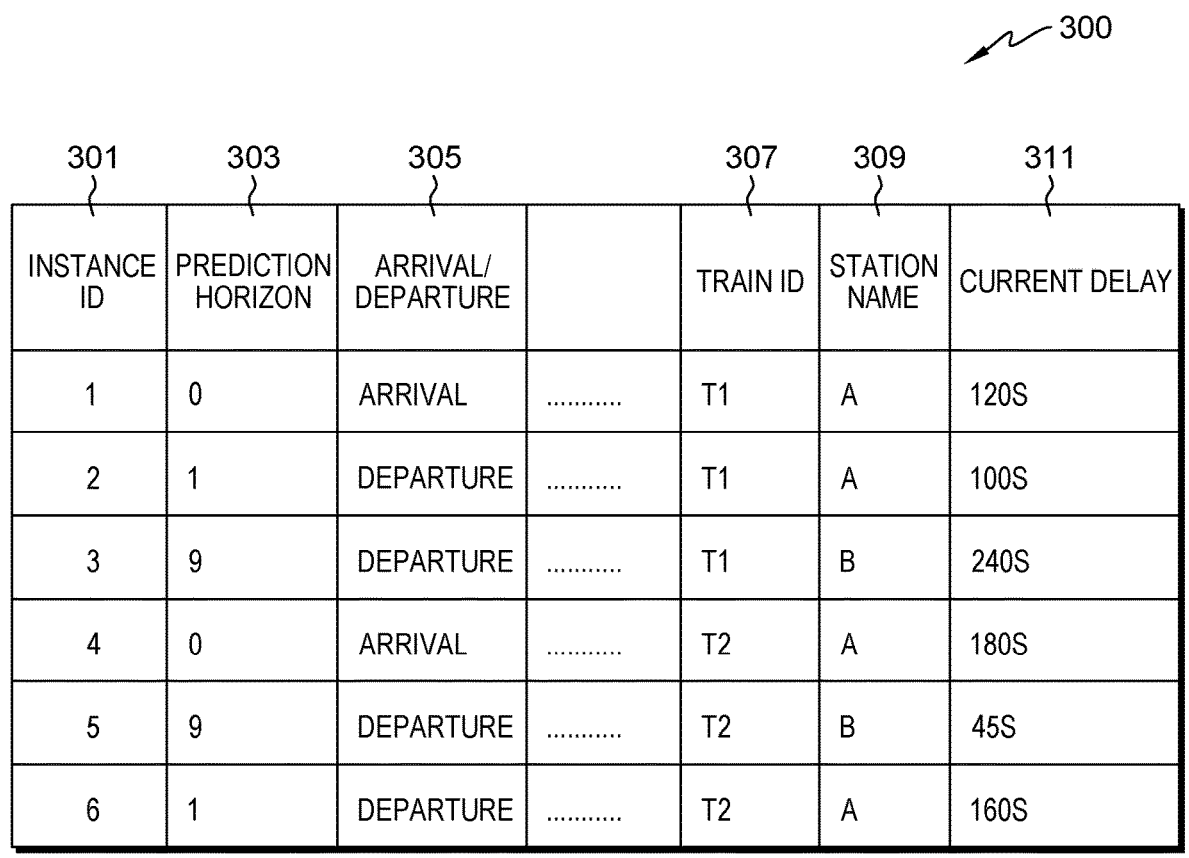
FIG. 3 is an illustrative example of a model property vector in accordance with one or more embodiments of the present invention.

FIG. 3 is an illustrative example of a model property vector 300 constructed in accordance with one or more embodiments of the present invention. The model property vector 300 is created in model property vector space from identified information for each of a plurality of data instances, as was previously described in connection with block 107 of FIG. 1.

Returning to FIG. 3, the model property vector 300 relates to an illustrative scenario where it is desired to predict arrival and departure times for a set of trains including a first train T1 and a second train T2. The first train T1 and the second train T2 travel between a first station A and a second station B. The model property vector 300 may be used, for example, in conjunction with a time delay prediction application for a railway system. In this context, one objective is to build a system that predicts train delay for any passenger train in a given railway network. A predictive model in such a scenario corresponds to a pair of stops, such as a first station A and a second station B. For every train about to

TABLE 1

| | Train model before clustering? | Clustering on model property space? | Having a separate model property space? | Clustering on data feature space? |
|---|---|---|---|---|
| Procedures of FIGS. 1 and 2 | NO | YES | YES | NO |
| Model Clustering on the Model Parameter Space | YES | YES | YES | NO |
| Conventional Data Clustering | NO | NO | NO | YES |
| Prediction by Clustering | NO | NO | NO | YES |

With reference to Table 1, the procedures of FIGS. 1 and 2 do not train models before clustering, nor is clustering on data feature space performed. Rather, clustering is performed on model property space, and a separate model property space is provided. This is in contrast to model clustering on the model parameter space which does train leave the first station A toward the second station B, the model makes a prediction of delay for the train arriving at the second station B.

The number of required models is a quadratic function of a total number of train stations. For example, there are 541 Amtrak™ rail stations in the United States, along with an additional 167 New Jersey Transit stations serving the greater New York area, 154 SEPTA™ train stations serving Philadelphia and its suburbs, 91 stations on the Washington, D.C.-based Metro™ system, and 241 train stations on the various Metra™ lines serving the Chicago area. Likewise, in Germany, there are over 5,000 train stations. It would be computationally expensive to build and manage 25 million models at once. But, by using the procedures of FIGS. 1 and 2, the number of required models may be reduced.

The model property vector 300 (FIG. 3) includes an instance identifier (id) 301 identifying a data instance. Each instance identifier 301 is associated with a corresponding prediction horizon 303, an arrival or departure 305 field, a train identifier (ID) 307, a station name 309, and a current delay 311. The prediction horizon 303 is a positive integer representing a number of stops or train stations in between a current stop or station and a target stop or station. The arrival or departure 305 field comprises a prediction category that specifies when a prediction is to be made concerning an arrival time as opposed to a departure time. The train ID 307 identifies a specific train, such as the first train T1 and the second train T2. The station name identifies a specific train station, such as the first station A or the second station B. The current delay 311 specifies a current delay in units of seconds.

The model property vector 300 is in a model property space that is a sub-space of a larger data feature space for a database or a set of databases on which data analytics may be performed. The model properties of the model property vector 300 were selected because they directly influence the accuracy of prediction.

The procedure of FIG. 1 may be applied to the train example of FIG. 3 as follows. At block 101 of FIG. 1, the data is the raw information in the table of FIG. 3. Then at block 103 (FIG. 1), a user specifies a model property vector space which, in the present example, includes two columns: the prediction horizon 303 (FIG. 3), and the arrival or departure 305 field. At blocks 105-107 (FIG. 1), a vector is created in the model property vector space for each data instance. For example, a data instance with an instance identifier (id) 301 (FIG. 3) of 1 will be represented by a vector (0, arrival), while a data instance with an instance identifier (id) 301 of 2 will be represented by a vector (1, departure).

With respect to block 109 (FIG. 1), the user defines or specifies a number or quantity of clusters they would like to build. For example, the user may wish to build three clusters. At blocks 111-113, a clustering algorithm is applied. Three respective clusters are outputted which have corresponding data instances with ids of (1,4), (2,6) and (3,5) (FIG. 3). Then, at block 115 (FIG. 1), three predictive models are built from three training datasets containing the corresponding data instances for each of the three clusters.

Figure 4:
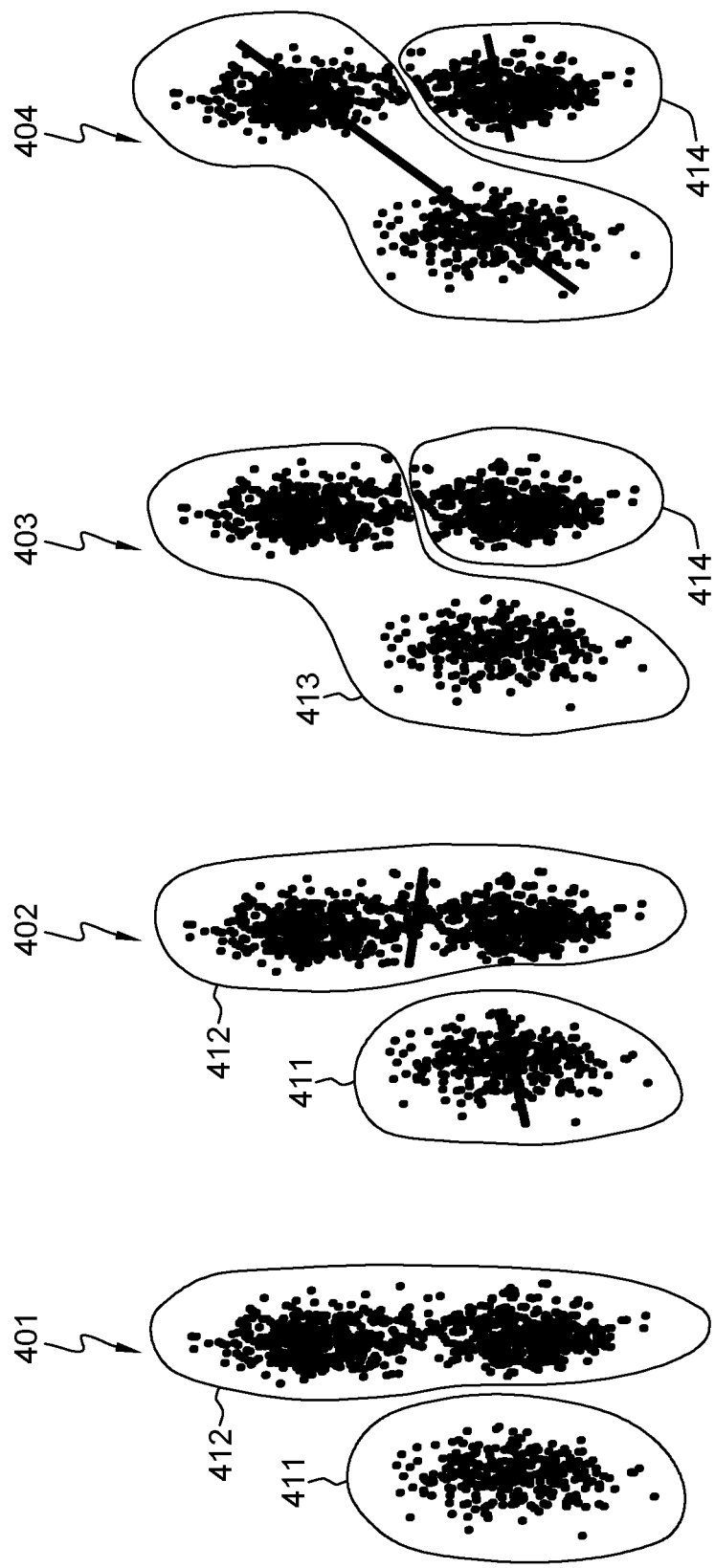
FIG. 4 is an illustrative example of a set of data clusters processed using the method of FIG. 1 in accordance with one or more embodiments of the present invention.

FIG. 4 is an illustrative example of a set of data clusters processed using the method of FIG. 1 in accordance with one or more embodiments of the present invention. A first data cluster diagram 401 includes a first cluster 411 and a second cluster 412. The first cluster 411 and the second cluster 412 were determined by performing a conventional data clustering procedure. The second data cluster diagram 402 illustrates a linear modeling procedure being applied to the first data cluster diagram 401 to generate a linear model for the first cluster 411 and a linear model for the second cluster 412. Note that the linear model is a poor fit for the second cluster 402.

The third data cluster diagram 403 illustrates a third cluster 413 and a fourth cluster 414. The third cluster 413 and the fourth cluster 414 may be provided using any of the procedures of FIGS. 1 and 2 which perform model clustering followed by modeling. The third data cluster diagram 403 shows application of a data partition based on model clustering to provide the third cluster 413 and the fourth cluster 414. The fourth data cluster diagram 404 shows application of a linear modeling procedure to each of the third cluster 413 and the fourth cluster 414. Note the improved linear fit of the fourth data cluster diagram 404 compared to the poor linear fit of the second data cluster diagram 402.

Figure 5:
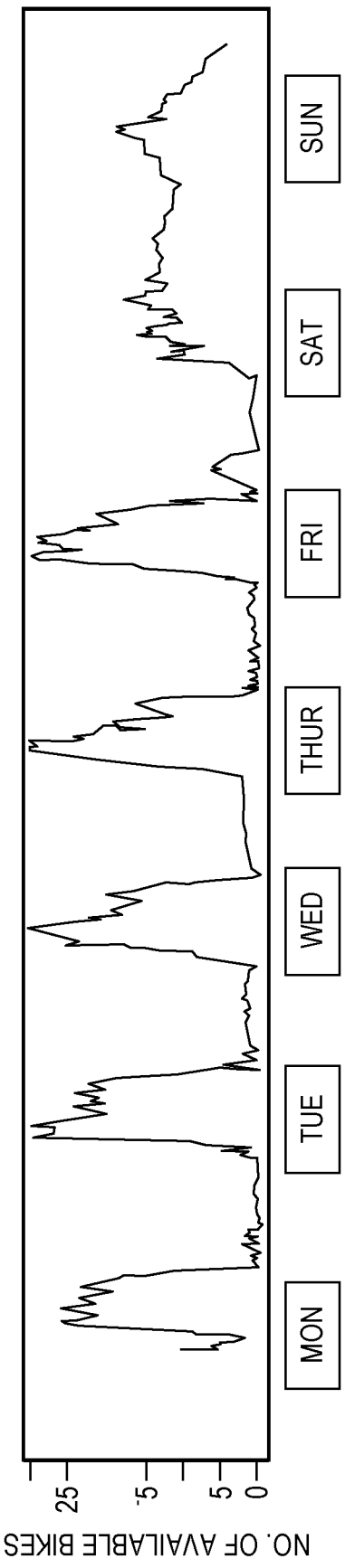
FIG. 5 is a graph illustrating a number of available bicycles versus time for a first transportation station for use with the method of FIG. 1 in accordance with one or more embodiments of the present invention.
Figure 6:
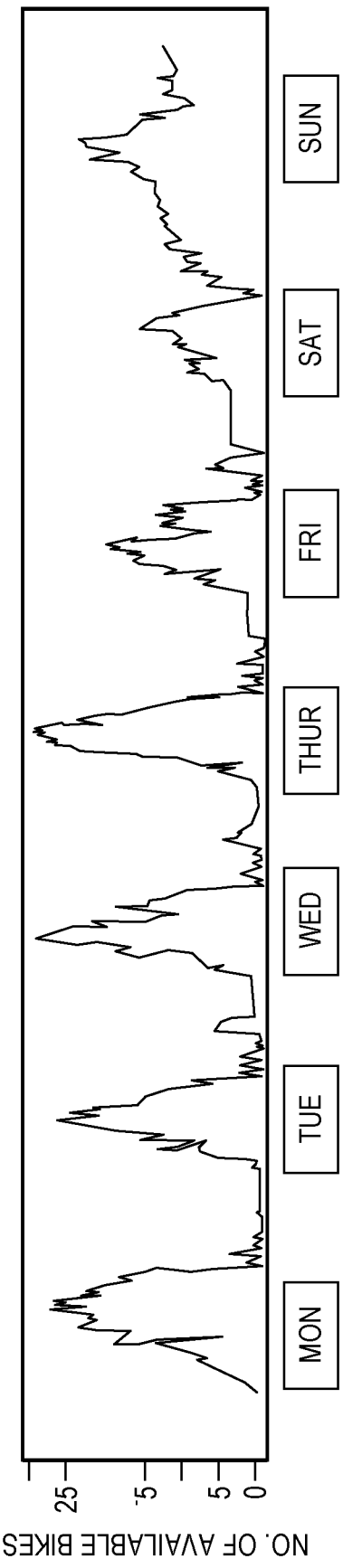
FIG. 6 is a graph illustrating a number of available bicycles versus time for a second transportation station for use with the method of FIG. 1 in accordance with one or more embodiments of the present invention.

FIG. 5 is a graph illustrating a number of available bicycles versus time for a first transportation station, and FIG. 6 is a graph illustrating a number of available bicycles versus time for a second transportation station, in accordance with one or more embodiments of the present invention. For purposes of illustration, the first transportation station is the Roselle station, and the second transportation station is the Medinah station. The Medinah station is adjacent to the Roselle station along a rail line that serves the city of Chicago. Both the Roselle station and the Medinah station provide a number of shared communal bicycles that are available on a first-come, first-served basis. These bicycles are provided for the convenience of area residents who are living within a few miles of the train station, to reduce or eliminate the need for on-site automobile parking at the station.

With reference to FIG. 5, note that bike availability at the Roselle station peaks during the mid-day hours, but is lowest during the early morning and late evening hours. This pattern is observed due to commuters using bicycles to travel to the train station in the morning, leaving the bicycles at the station during the day, and riding the bikes home after they reach the station in the evening. Likewise, with reference to FIG. 6, bike availability also peaks during the mid-day hours but is lowest during the early morning and late evening hours.

Due to the fact that the number of available bicycles at adjacent stations displays a similar pattern, it is possible to utilize the same identical model for both the Roselle station and the Medinah station. As observed previously in connection with FIG. 3, it would be computationally expensive to build and manage 25 million models at once for a nationwide rail system. But, by noting the similarities in the patterns of FIGS. 5 and 6, the number of required models may be reduced.

Figure 7:
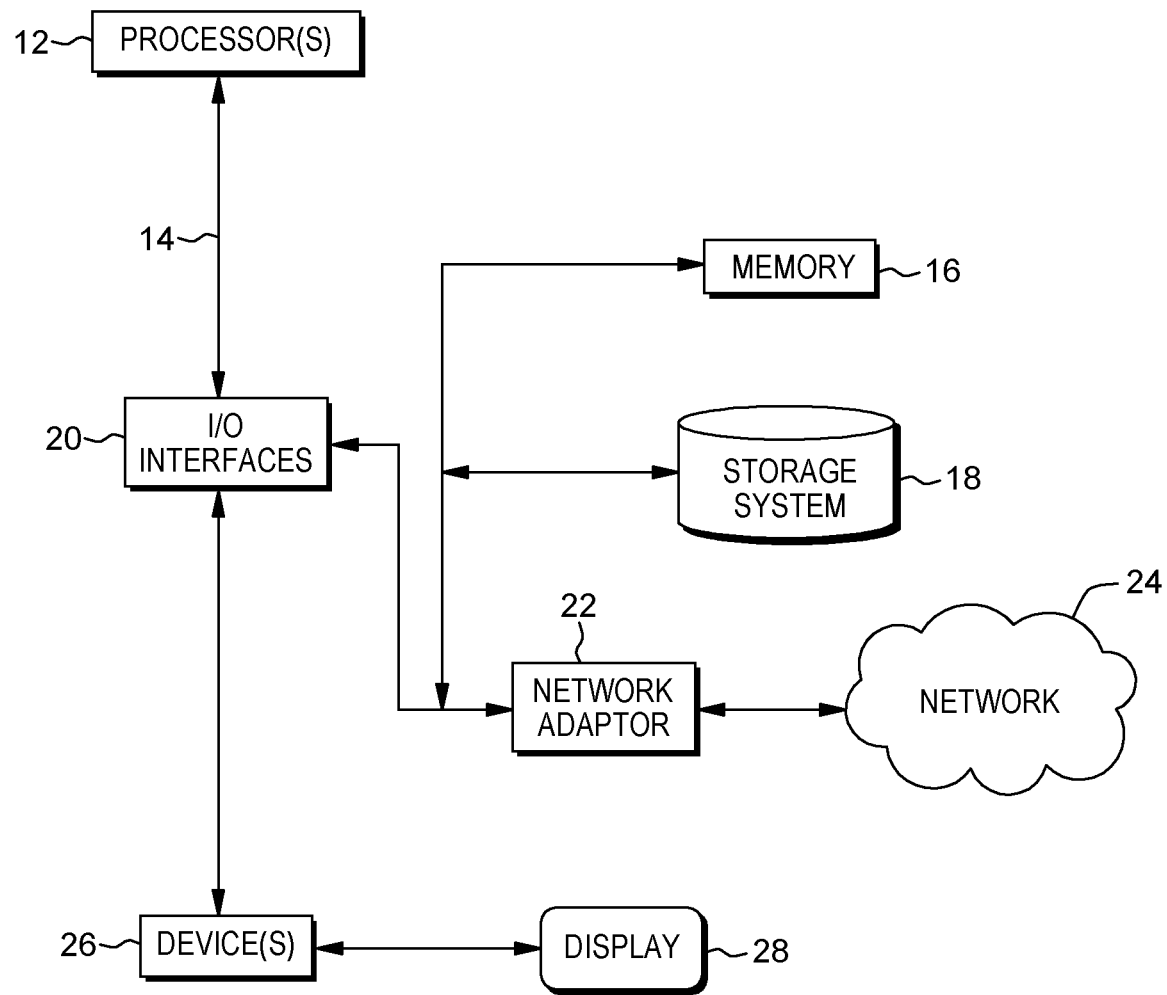
FIG. 7 illustrates an exemplary apparatus for performing a data clustering procedure in accordance with in accordance with one or more embodiments of the present invention.

FIG. 7 illustrates an exemplary apparatus for performing a data clustering procedure in accordance with in accordance with one or more embodiments of the present invention. This computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for performing data clustering in a model property vector space, the method comprising:
   receiving input data from a database, the input data comprising a plurality of data instances in a data vector space, said plurality of data instances representing temporal features and geographical features information;
   defining a model property vector specification for creating a model vector in a model property vector space, the model property vector specification including one or more categories of information to be predicted for a predictive analytic problem;
   using the input data and the model property vector specification to identify information from the input data, the identified information comprising a temporal feature attribute, a geographic feature attribute, and a categorical attribute used to specify an item to be predicted for a predictive model;
   creating a model property vector in the model property vector space from the identified information for each data instance of the plurality of data instances, said model property vector space being separate from the data vector space and having data instances defining a sub-space of the data vector space;
   identifying a target number of clusters comprising a plurality of data clusters;
   using the target number of clusters and the data instances in the model property vector space to perform a data clustering procedure to cluster data in the model property vector space;
   generating an output from the data clustering procedure comprising a plurality of data segments and one or more clustering rules for the plurality of data clusters; and
   for each data cluster of the plurality of data clusters, constructing a predictive model for each data segment of the plurality of data segments.

2. The computer-implemented method of claim 1, further comprising training the predictive model after the data clustering procedure is performed.

3. The computer-implemented method of claim 1 wherein the categorical attribute differentiates among a plurality of types or categories of prediction.

4. The computer-implemented method of claim 1, wherein the model property vector specification further indicates how categories of information to be predicted for is organized within the model property vector.

5. The computer-implemented method of claim 1, wherein the temporal attribute information comprises a temporal prediction problem attribute, said prediction problem attribute comprising a prediction horizon.

6. The computer-implemented method of claim 1, wherein the geographical attribute information comprises a geographical attribute used to predict a geographic location.

7. A computer program product for performing data clustering in a model property vector space, the computer program product comprising a computer-readable storage medium having a computer-readable program stored therein, wherein the computer-readable program, when executed on a processor, causes the processor to:
receive input data from a database, the input data comprising a plurality of data instances in a data vector space, said plurality of data instances representing temporal features and geographical features information;
define a model property vector specification for creating a model vector in a model property vector space, the model property vector specification including one or more categories of information to be predicted for a predictive analytic problem;
use the input data and the model property vector specification to identify information from the input data, the identified information comprising a temporal feature attribute, a geographic feature attribute, and a categorical attribute information used to specify an item to be predicted for a predictive model;
create a model property vector in the model property vector space from the identified information for each data instance of the plurality of data instances, said model property vector space being separate from the data vector space and having data instances defining a sub-space of the data vector space;
identify a target number of clusters comprising a plurality of data clusters;
use the target number of clusters and the data instances in the model property vector space to perform a data clustering procedure to cluster data in the model property vector space;
generate an output from the data clustering procedure comprising a plurality of data segments and one or more clustering rules for the plurality of data clusters; and
for each data cluster of the plurality of data clusters, construct a predictive model for each data segment of the plurality of data segments.

8. The computer program product of claim 7, further configured for training the predictive model after the data clustering procedure is performed.

9. The computer program product of claim 8 wherein the categorical attribute differentiates among a plurality of types or categories of prediction.

10. The computer program product of claim 7, wherein the model property vector specification further indicates how categories of information to be predicted for is organized within the model property vector.

11. The computer program product of claim 7, wherein the temporal attribute information comprises a temporal prediction problem attribute, said prediction problem attribute comprising a prediction horizon.

12. The computer program product of claim 7, wherein the geographical attribute information comprises a geographical attribute used to predict a geographic location.

13. An apparatus for performing data clustering in a model property vector space, the apparatus comprising a processor and a memory coupled to the processor, wherein the memory comprises instructions which, when executed by the processor, provide:
a model property vector creation module;
a data clustering module operatively coupled to the model property vector creation module; and
a predictive models training module operatively coupled to the data clustering module;
wherein the model property vector creation module is configured to receive input data from a database, the input data comprising a plurality of data instances in a data vector space, said plurality of data instances representing temporal features and geographical features information; define a model property vector specification for creating a model vector in a model property vector space, the model property vector specification including one or more categories of information to be predicted for a predictive-analytic problem; use the input data and the model property vector specification to identify information from the input data, the identified information comprising a temporal feature attribute, a geographic feature attribute, and a categorical attribute information used to specify an item to be predicted for a predictive model; create a model property vector in the model property vector space from the identified information for each data instance of the plurality of data instances, said model property vector space being separate from the data vector space and having data instances defining a sub-space of the data vector space; and identify a target number of clusters comprising a plurality of data clusters;
wherein the data clustering module is configured to use the target number of clusters and the data instances in the model property vector space to perform a data clustering procedure to cluster data in the model property vector space; and to generate an output from the data clustering procedure comprising a plurality of data segments and one or more clustering rules for the plurality of data clusters; and
wherein the predictive models training module is configured, for each data cluster of the plurality of data clusters, to construct a predictive model for each data segment of the plurality of data segments.

14. The apparatus of claim 13, further configured for training the predictive model after the data clustering procedure is performed.

15. The apparatus of claim 13 wherein the categorical attribute differentiates among a plurality of types or categories of prediction.

16. The apparatus of claim 13, wherein the model property vector specification further indicates how categories of information to be predicted for is organized within the model property vector.

17. The apparatus of claim 13, wherein the temporal attribute information comprises a temporal prediction problem attribute, said prediction problem attribute comprising a prediction horizon.

* * * * *